United States Patent [19]

Phillips

[11] 4,287,319

[45] Sep. 1, 1981

[54] COMPOSITIONS OF POLYVINYLPYRIDINE AND IODINE

[75] Inventor: Gary M. Phillips, St. Paul, Minn.

[73] Assignee: Medtronic, Inc., Minneapolis, Minn.

[21] Appl. No.: 114,730

[22] Filed: Jan. 23, 1980

Related U.S. Application Data

[63] Continuation of Ser. No. 6,003, Jan. 24, 1979, abandoned.

[51] Int. Cl.$^3$ .............................................. C08F 8/22
[52] U.S. Cl. .................................... 525/336; 260/694; 525/1; 525/356; 546/255
[58] Field of Search ........................... 525/356, 336, 1; 136/83 R; 260/694; 429/213; 546/255

[56] References Cited

U.S. PATENT DOCUMENTS

| | | | |
|---|---|---|---|
| 2,754,245 | 7/1956 | Hosmer | 525/356 |
| 3,136,755 | 6/1964 | Grosser et al. | 525/356 |
| 3,660,163 | 5/1972 | Moser | 136/83 |
| 3,674,562 | 7/1972 | Schneider et al. | 136/83 R |
| 3,773,557 | 11/1973 | Mead | 136/83 R X |
| 3,817,791 | 6/1974 | Greatback et al. | 136/83 R |
| 3,895,962 | 7/1975 | Mead | 136/83 R |
| 4,010,043 | 3/1977 | Schneider | 29/523.2 |
| 4,027,083 | 5/1977 | Herle et al. | 525/356 |
| 4,148,975 | 4/1979 | Schneider et al. | 429/174 |
| 4,157,433 | 6/1979 | Phillips | 525/356 |
| 4,223,110 | 9/1980 | Phillips et al. | 525/356 |

OTHER PUBLICATIONS

"The Lithium Iodine Cell," Medical Electronics and Data, Schneider et al., (1977).
"Performance Characteristics of Long Life Pacemaker Cell," Proceedings of 9th Internat. Symposium, (1974), Greatbatch et al.
"Halogen Induced Modification of Poly-2-Vinylpyridine," Power Sources for Biomedical Application, vol. 80-4, McLean et al.
Lithium Cell, "High-Reliability Long-Life Solid Electrolyte System," Krans et al., pp. 144-147, 1976, Power Source Sym.
"New Pulse Method," Brodd-Jour. Electrochem. Soc., 6-1959, vol. 106, #6.
"Determination of Ohmic Contribution," "Lucesoli et al., Electrochem. Technology, 7-1970, vol. 117, #7.
"Measurement of Beta-Alumina Impedance," Farrington, J. Electrochem. Soc., 10-1974, vol. 121, #20.
"Pulse Method for Measuring Resist. of Electrolytes," Ivanov et al., Electrokhimiya, vol. 8, #12, pp. 1861-1864, (1972).
Investigations of Kinetics of Hydrogen & Oxygen Reactions, Schuldiner et al., Electrochem. Soc., vol. 112, #2, (2-1965).
Experimental Difficulties, Abstract #132, Theoretical Electrochemistry, p. 61.

*Primary Examiner*—William F. Hamrock
*Attorney, Agent, or Firm*—Schroeder, Siegfried, Ryan, Vidas, Steffey & Arrett

[57] ABSTRACT

Compositions of and methods for the preparation of polyvinylpyridine and iodine (PVP.nI$_2$) as cathode materials for electrochemical cells.

3 Claims, 5 Drawing Figures

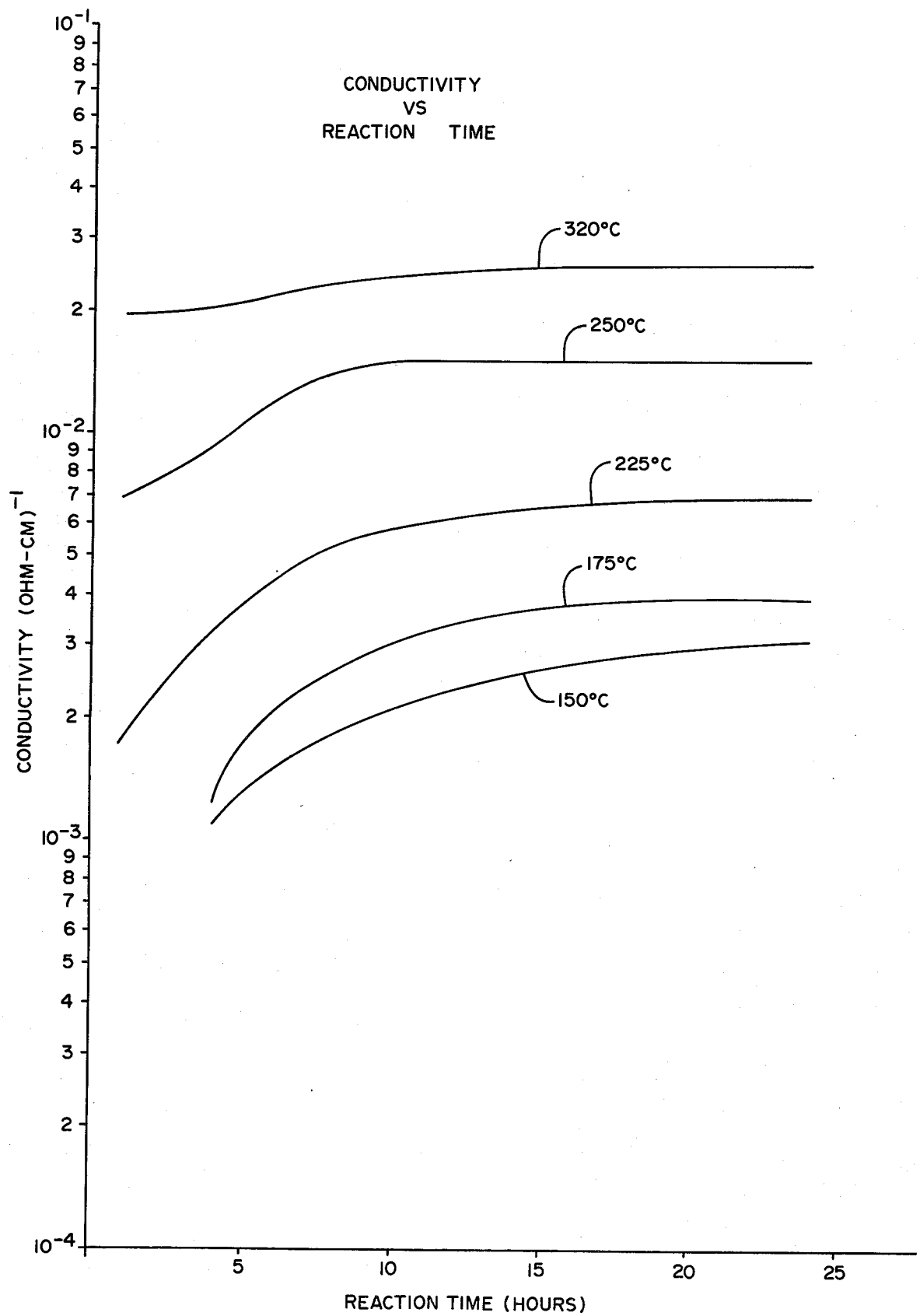

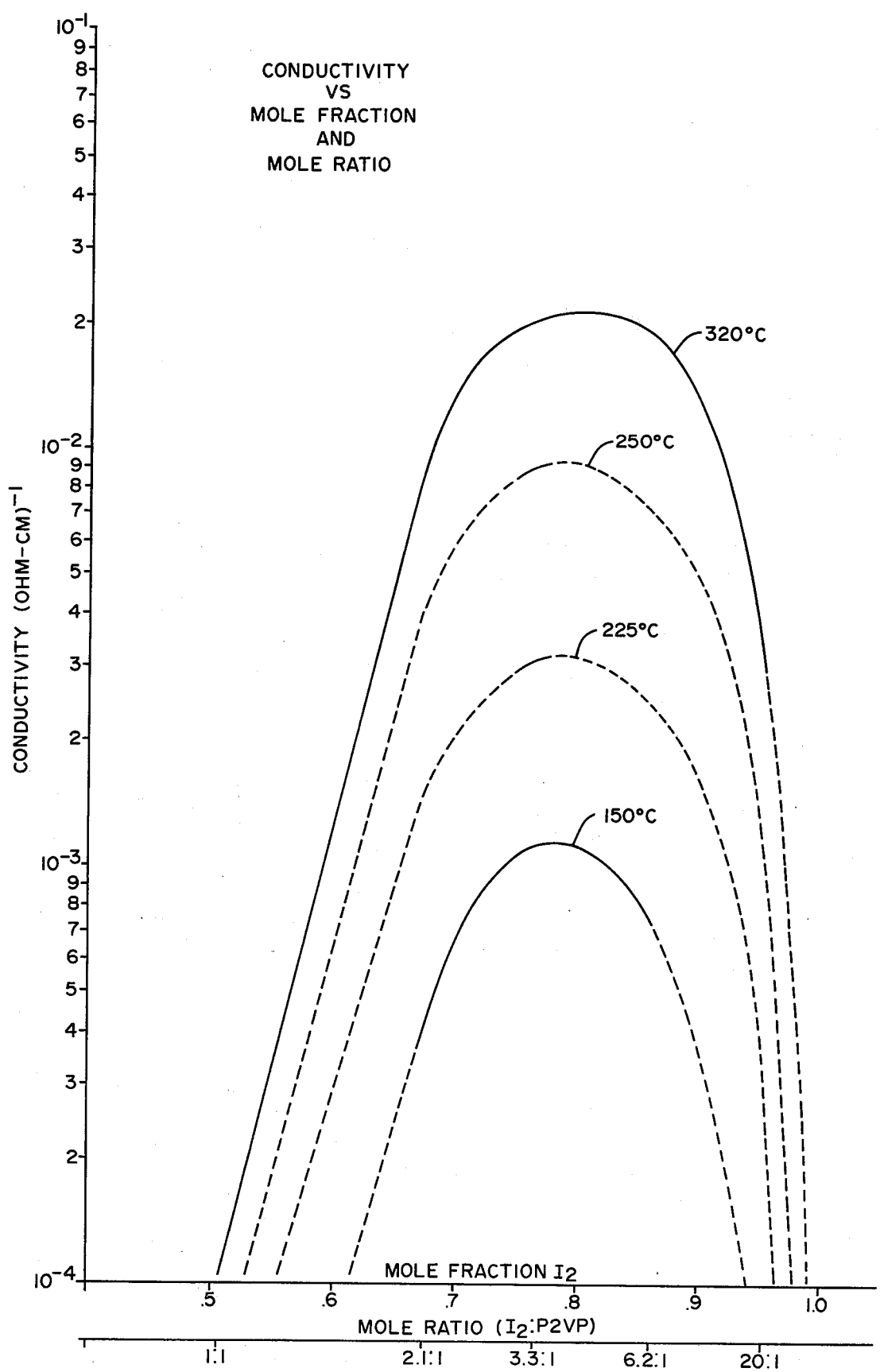

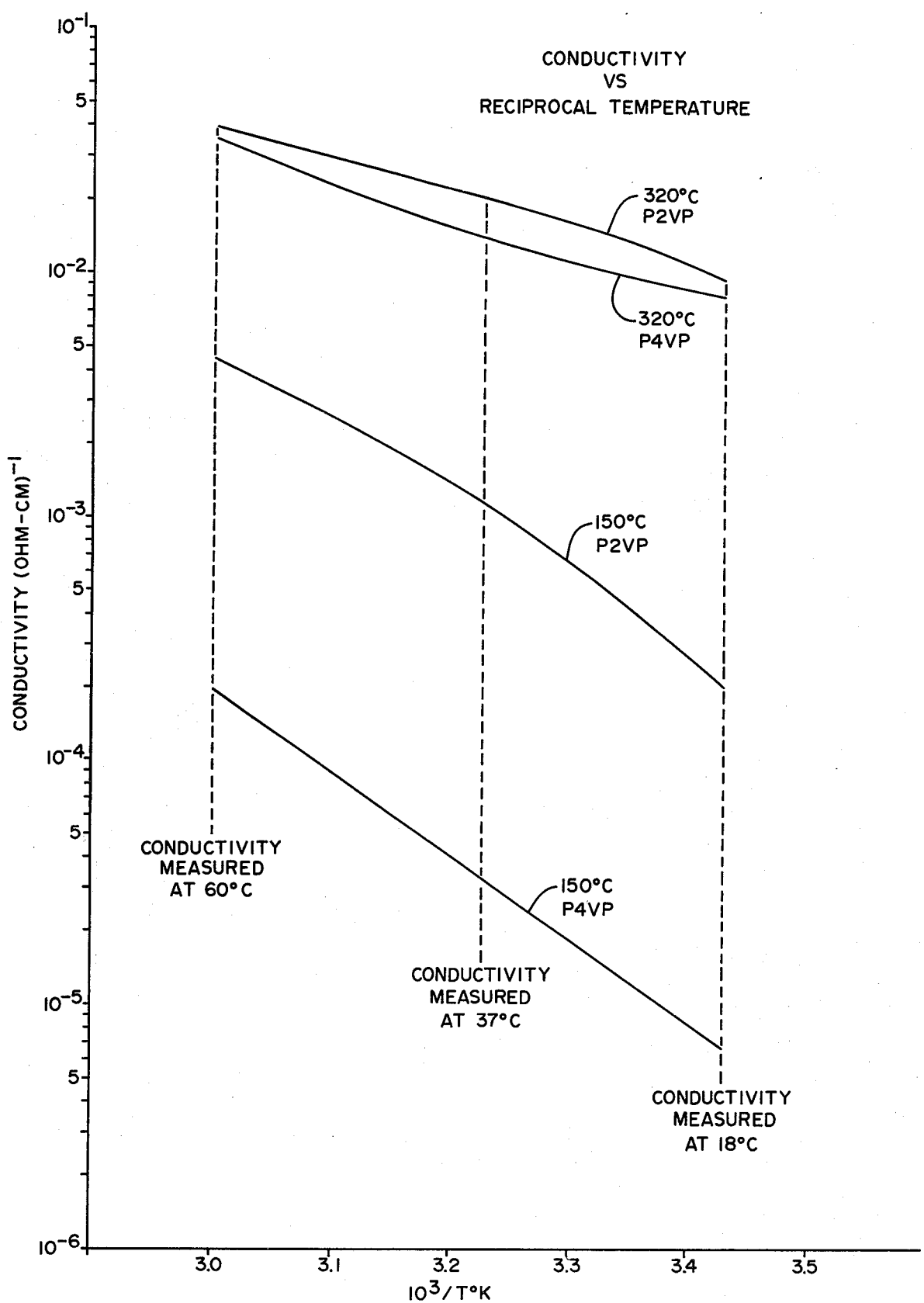

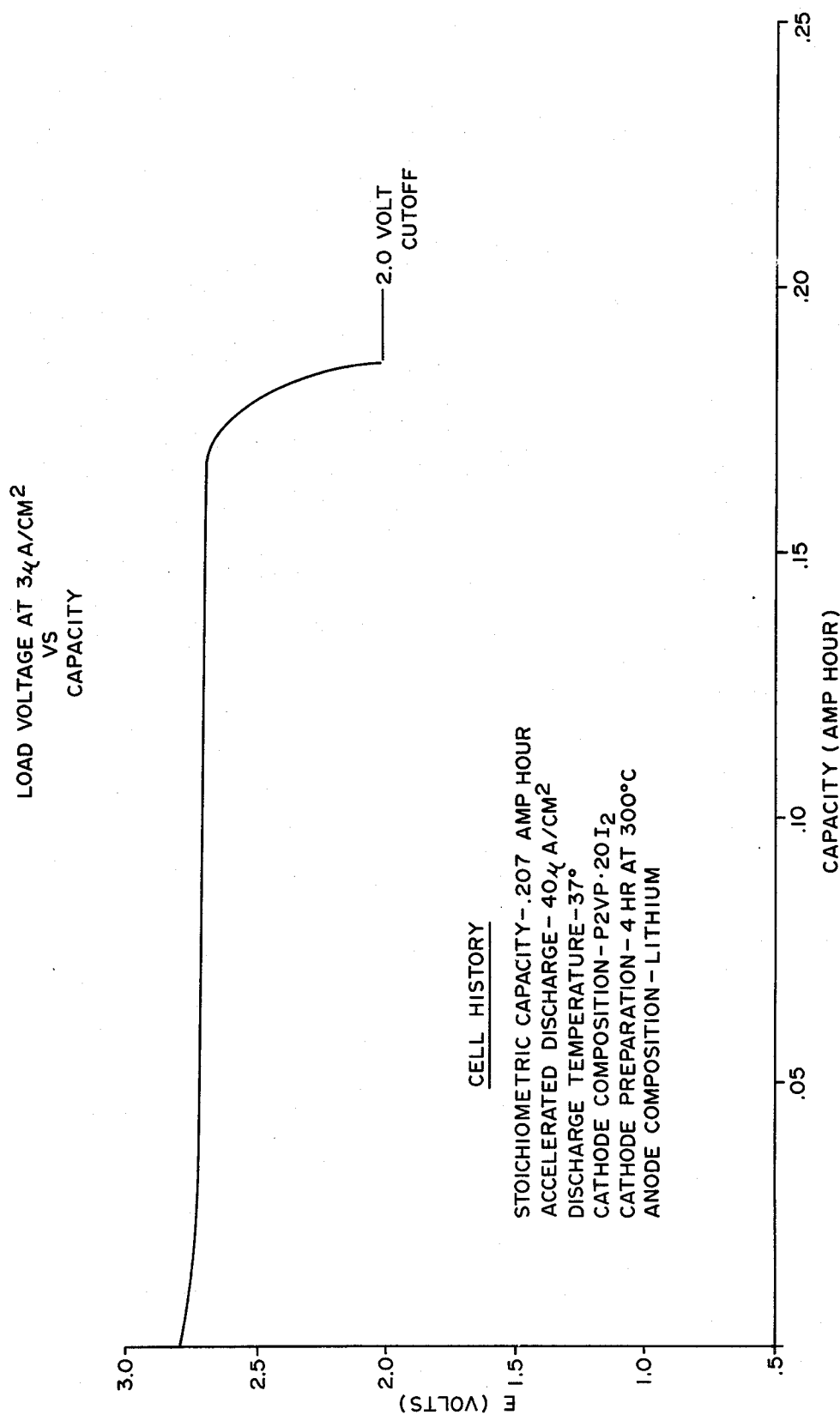

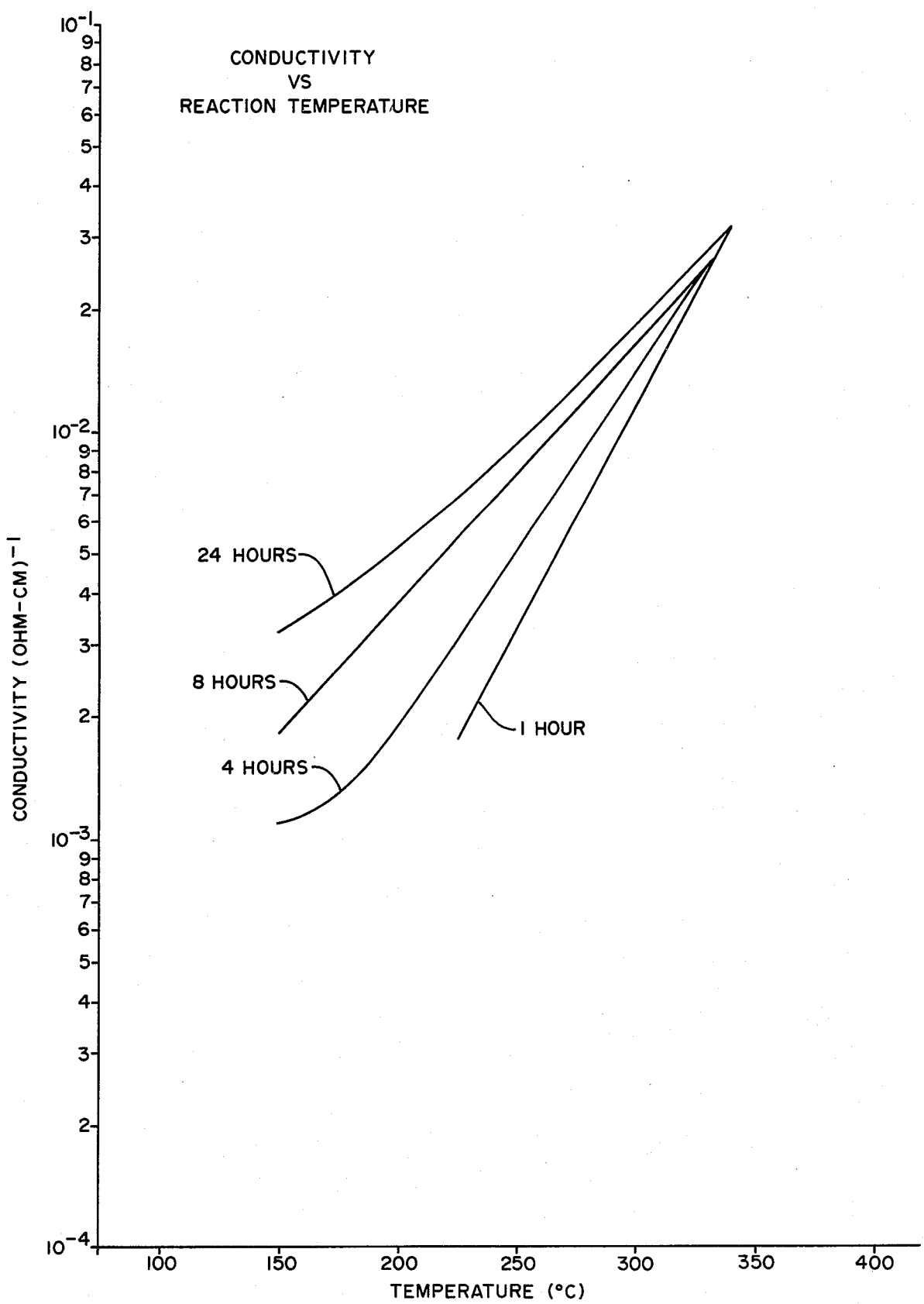

COMPOSITIONS OF POLYVINYLPYRIDINE AND IODINE

BACKGROUND OF INVENTION

This is a continuation of application Ser. No. 6,003, filed Jan. 24, 1979 abandoned.

Batteries, such as those of the lithium/iodine type for example, sometimes referred to as solid state cells, make use of a cathode material comprised of iodine and an iodine containing charge transfer compound. Charge transfer compounds are sometimes referred to as complexes and sometimes as donor-acceptor compounds. The iodine in such a cathode reacts electrochemically with the lithium anode to provide a voltage output. This reaction causes a lithium iodide electrolyte to form in situ between the anode and cathode. The charge transfer donor typically used is a polyvinylpyridine, (PVP) such as poly-2-vinylpyridine (P2VP) or poly-4-vinylpyridine (P4-VP). Additional amounts of free iodine ie., excess iodine which is not combined with the charge transfer donor are usually included as part of the cathode material to provide an iodine "reservoir" for the battery to draw on during discharge. The additional iodine increases the useful life of the battery.

Unfortunately, the polyvinylpyridine-iodine cathode compositions, previously used such as P2VP and/or P4VP based cathodes have exhibited a conductivity which degrades severely with the addition of relatively large amounts of iodine to the complex. Such amounts of iodine are hereinafter referred to as "excess iodine". Consequently, this degradation in the conductivity of the composition has effectively limited the amount of iodine which could heretofore be included in such cathodes without degrading the conductivity of the material below a useful level. As a result, the polyvinylpyridine cathode materials, which have been previously available, have not had as high an energy density as is theoretically possible from an iodine based system. This fact is particularly important for such applications as in implantable medical devices, ie., heart pacemakers for example.

It is a purpose of this invention to provide polyvinylpyridine-iodine cathodes, P2VP and/or P4VP based, having markedly higher conductivity than has been heretofore possible. As a result, the preparation of useful cathode materials having a much higher iodine content, such as materials having a final mole ratio of 20:1 or greater overall iodine to P2VP and/or P4VP donor, is made possible. Consequently, higher energy densities and longer useful life are provided by the improved cathode materials prepared according to this invention.

Herein, "mole ratio" is defined in terms of the number of moles of iodine ($I_2$) to the number of gram formula weights of vinylpyridine in the initial polymer-donor mixture. For example, a mixture which initially contains 508 grams of $I_2$ and 10.5 grams of PVP would have a mole ratio (n) of 20:1 and will be designated as $PVP \cdot 20I_2$. "Mole fraction" is defined in an analogous manner as $n/n+1$, according to the above nomenclature.

For descriptive purposes herein, the term "complex" refers to any single phase iodine and donor mixture. The term "cathode material" refers to a material composed of a "complex" and may include excess iodine, which may be present as a solid phase.

SUMMARY OF THE INVENTION

The invention is directed to cathode materials and provides methods of preparing cathode materials from P2VP, P4VP or mixtures thereof with varying amounts of iodine, At least a part of the preparation must take place at temperatures in excess of about 225° C. in a sealed container in order to obtain the improved conductivities, which are characteristic of this invention.

In one form of the invention, following preparation of a highly conductive cathode material at elevated temperature, excess iodine is then added. The iodine may be added at room temperature and in amounts to provide a final mole ratio of about 20:1 or higher if desired. For example, a final mole ratio of 40:1 may be prepared in this manner. Smaller amounts may also be used.

In another form of the invention, a one-step technique may be used to prepare a high conductivity cathode material directly by initially adding the desired final amount of iodine. In this embodiment the desired relative final amounts of P2VP and P4VP donor and iodine are simply mixed together and heated to a temperature in excess of about 225° C.

BRIEF DESCRIPTION OF THE DRAWINGS

FIG. 1 is a graph showing conductivity plotted versus reaction time for samples of P2VP based cathode materials prepared at various reaction temperatures as indicated;

FIG. 2 is a graph showing conductivity plotted versus both "mole fraction $I_2$" and "mole ratio $I_2$ to P2VP" for samples of cathode materials prepared at various reaction temperatures, as indicated, with a four hour reaction time;

FIG. 3 is a graph showing the conductivity versus reciprocal temperature of cathode materials made from P2VP and P4VP donor materials ($PVP \cdot 3.3I_2$) prepared at various temperatures, as indicated, with a four hour reaction time;

FIG. 4 is a graph showing the voltage output versus capacity (expressed in amp-hours) of a battery having a P2VP based cathode material prepared according to the invention, and, FIG. 5 is a graph showing conductivity plotted versus reaction preparation heating temperature for the $P2VP \cdot 3.3I_2$ samples of cathode materials illustrated in FIG. 1, reaction time at temperature is indicated for each.

DESCRIPTION OF PREFERRED EMBODIMENTS

The invention is best illustrated by reference to the FIG. 1 graph which shows the conductivity (measured at 37° C.) of samples of $P2VP \cdot 3.3I_2$ (mole ratio) mixture heated at various temperatures plotted versus time of heating to form a cathode material. Heating is accomplished in a sealed container. It can be seen that heating at 175° C. will produce a conductivity no higher than about $4 \times 10^{-3}$ reciprocal ohm-cm no matter how long the heating takes place. On the other hand, heating such a mixture at about 225° C. produces a complex having a conductivity (at 37° C.) of about $7 \times 10^{-3}$ reciprocal ohm-cm. Heating at even higher temperatures produces cathode materials having even higher conductivities. It is also shown in FIG. 1 that less heating time is required to obtain improved conductivity as the heating temperature is increased above about 225° C. for preparing cathode materials. Thus, a predetermined minimum time of heating or reaction time is required depending on the heating or reaction temperature used in the preparation.

The $P2VP.3.3I_2$ materials produced by heating the components together in excess of about 225° C. are in and of themselves desirable cathode materials because of their high conductivities.

Other mole ratios of iodine mixed with P2VP donor behave in a similar manner ie., heating above about 225° C. provides higher conductivity, as is illustrated by the graph of FIG. 2. However, the mole ratio should be at least 1:1. In FIG. 2, the conductivity (measured at 37° C.) of cathode materials of various mole ratios [n in $(P2VP.nI_2)$] are plotted for various preparation or reaction temperatures. It can been seen that, for any selected mole ratio, 3.3 for example, the conductivity thereof is higher as one proceeds to higher preparation temperatures. It is preferred that the cathode material have a conductivity higher than about $1.5 \times 10^{-3}$ reciprocal ohm-cm and that the mole ratio be at least 12:1. This can be readily accomplished at temperatures of about 225° C. or higher.

P4VP donor material behaves similarly to P2VP donor material. This is illustrated in FIG. 3 which shows the conductivities of 3.3:1 mole ratio cathode materials made up from P2VP and P4VP donor materials with four hours reaction time at 150° C. and 320° C. In this Figure, the conductivities are plotted versus reciprocal temperature to show their relative activation energies. The upper 320° C. and upper 150° C. lines representing P2VP, the lower lines representing P4VP. The P2VP and P4VP complexes, prepared at 150° C. have similar slopes but different absolute conductivities. This indicates their conductivity mechanism is likely the same and the conductivity difference probably arises from these polymers inherent properties. However, when the cathode materials are prepared at 320° C. both the slopes and absolute conductivities are very similar. Thus, this invention also provides conductivity enhancement in P4VP based cathode materials which are comparable to P2VP based counterparts. All of the data suggest P2VP and P4VP behave analogously with regard to this invention.

Mixtures of P2VP and P4VP donor material may also be used. For example, a mixture of equal parts P2VP and P4VP was used to prepare a 3.3:1 mole ratio cathode material. The material prepared at 320° C. for four hours had a conductivity of $1.15 \times 10^{-2}$ reciprocal, ohm-cm.

High conductivity in the cathode material is necessary because, as already pointed out, high additional amounts of iodine added to the material degrades its conductivity. By providing a high initial conductivity in the material, larger amounts of iodine can be added thereto without degrading the final conductivity of the resultant material to a low undesirable value. With higher ratios, one can expect to maintain a conductivity of about $10^{-3}$ reciprocal ohm-cm or better with the techniques of this invention while also obtaining a much improved deliverable energy density than has been heretofore possible. As can be seen in the graph of FIG. 4, a $P2VP.20I_2$ (mole ratio) cathode material prepared according to the invention and tested in a battery having a lithium anode provided about 90% of stoichiometric capacity to a 2.0 Volt cut-off. The cathode material was prepared by heating a mixture of $P2VP.3.3I_2$ to 300° C. for about four hours in a sealed glass container. Upon cooling, excess iodine was added to the material to provide a final mole ratio of $P2VP.20I_2$.

Cells made according to the invention at 20:1 mole ratio from P4VP based materials behave similar to the P2VP based material prepared according to the invention. For example, a P4VP cell had an initial open circuit voltage (OCV) of 2.74 volts as compared with 2.78 volts for a P2VP cell. At 10 k ohm load the P4VP cell had a voltage of 2.65 volts while a comparable P2VP cell had a voltage of 2.60 volts. The lack of substantial differences between these cells indicates that the P4VP based cathodes will enjoy performance enhancement similar to that for the P2VP cells when prepared according to the invention.

The ability to include large quantities of excess iodine with more highly conductive materials, formed with the polyvinylpyridine polymer and iodine, is an important feature of this invention from the energy density standpoint as already indicated.

There are two ways to incorporate the excess iodine with the material. In the first and presently most preferred form, the polyvinylpyridine polymer component is mixed with a relatively low amount of iodine, such as 3.3 mole ratio or less, ie., enough to merely form a single phase cathode material with little or no excess iodine. As previously described, the mixture is heated in excess of about 225° C. for a predetermined period of time, dependent upon the temperature selected, to form material of improved conductivity. For example, as shown in FIG. 1, heating a 3.3 mole ratio sample at about 225° C.–320° C. for about one hour produces improved material. An 8 hour reaction time appears to be adequate to assure complete reaction. However, longer times may be used. An additional amount of iodine may then be added, at any convenient temperature ie., room temperature or elevated, to provide any desired excess amount in the final cathode material resulting from this preparation.

More specifically, in accordance with this first form of the invention, a highly conductive material is prepared from P2VP, P4VP or mixtures thereof ie., $P2VP.nI_2$ and/or $P4VP.nI_2$ where n (indicative of mole ratio) may range from about 1.0 to 3.3. A preferred value for n is 3.3 in the case of P2VP and iodine. Such a preferred composition prepared in accordance with this invention will exhibit a conductivity on the order of $4 \times 10^{-3}$ reciprocal ohm-cm or higher. Optionally, additional iodine may then be added.

The high conductivity obtained in the cathode materials prepared by the first method of the invention is illustrated by referring again to FIG. 1. The Figure also demonstrates the practical parameters of time and temperature involved in the method of the invention. Several samples of $P2VP.3.3I_2$ cathode materials were prepared in sealed containers at various temperatures and times ranging over 150° C. to 320° C. and from one hour to twenty-four hours. The 3.3:1 mole ratio materials used in preparing this Figure are illustrative. As already pointed out, various other ratios are possible as desired.

As can be seen from FIG. 1, samples heated at 250° C. for at least about 8 hours, upon cooling and measuring the conductivity thereof at 37° C., exhibit a conductivity on the order of $10^{-2}$ reciprocal ohm-cm or greater. On the other hand, the time for heating at 320° C. can be shortened to on the order of an hour or so to attain or exceed a 37° C. conductivity of the order of $10^{-2}$ reciprocal ohm-cm. The 37° C. temperature at which conductivity is measured for samples discussed herein was selected arbitrarily. Other temperatures may be used for measuring the conductivity of these materials so long as any selected temperature is used consistently for purposes of comparison between samples.

Heating temperatures in excess of 350° C. show no substantial increased benefit as to heating time in attaining the high conductivity levels of this invention. The graph of FIG. 5 illustrates this aspect using the same samples as were used for FIG. 1. In FIG. 5 the conductivity of the samples, in reciprocal ohm-cm at 37° C., is plotted against temperature to show that there is an effective maximum temperature to which all of the samples converge. The maximum temperature is on the order of about 325°–350° C. From a practical standpoint, heating at temperatures in excess of this level appears to be of no benefit.

As seen in FIG. 3, P4VP based compounds can be prepared over the same temperature range as those of P2VP.

Upon cooling to room temperature, following the above preparation, the high conductivity P2VP, P4VP or mixed P2VP/P4VP cathode material will be more or less fluid depending on the amount of iodine included therein and the temperature to which it was heated.

In order to prepare a high energy density cathode material it is only necessary to mix additional iodine with the above described materials. Preferably, the iodine is ground into a convenient powder form for this purpose. Elevated temperatures may be used but are not necessary. The amount of iodine may be selected to provide any desired final mole ratio relative to the P2VP and/or P4VP organic constituents. In the case of batteries for implantable medical devices, it is preferred that the final mole ratio be of at least the order of 12:1.

For example, using a P2VP.$3.3I_2$ material prepared according to the invention, having a conductivity in excess of $10^{-2}$ reciprocal ohm-cm and being fluid in form, powdered iodine was added thereto in sufficient quantity to provide a material having a final mole ratio of about 20:1. The resultant cathode material was of a wet sand-like consistency and dark appearance. It was pressed to a density of about 4.7 g/cc and used in a battery.

In the second form of the invention, highly conductive cathode materials are prepared ranging over various iodine mole ratios by simply including the desired final amount of iodine in the heating container with the polyvinylpyridine polymer, sealing the container and heating it to a temperature greater than about 225° C. for a predetermined time dependent on the selected temperature.

The table shows the conductivity of several samples of 20:1 mole ratio cathode material prepared according to one or the other of the two forms of the invention.

The first four cathodes were prepared by the first form or the two-step method using initial mole ratios between 1:1 and 6.2:1 and diluting with additional iodine to provide the final 20:1 mole ratio.

The table also shows a sample prepared according to the second form of the method of the invention ie., sufficient iodine being added initially to result in a cathode material having a final 20:1 mole ratio. As can be seen, all samples had conductivities between 1.2 and $2.1 \times 10^{-3}$ reciprocal ohm-cm.

TABLE

| Reaction Temperature Composition* (Mole Ratio $I_2$:P2VP) | Conductivity of Final P2VP . $20I_2$ at 37° C. (ohm-cm)$^{-1}$ |
| --- | --- |
| 1:1 | $1.25 \times 10^{-3}$ |
| 2.1:1 | $1.39 \times 10^{-3}$ |
| 3.3:1 | $1.75 \times 10^{-3}$ |
| 6.2:1 | $2.05 \times 10^{-3}$ |
| 20:1 | $1.56 \times 10^{-3}$ |

*Reaction time 4 hours at 320° C.

Examples of PVP which may be used with this invention are shown below. PVP from other sources will also be satisfactory for use with the invention.

P2VP may be synthesized as follows:

Benzoyl peroxide (2.0 grams) is dissolved in freshly distilled 2-vinylpyridine (200 grams). Water (400 ml) is added and the mixture is purged with nitrogen for 1 hour. With continued purging, the mixture is heated at 85° C. with stirring and kept at that temperature for two hours. The organic phase will thicken and develop a brown color during this time. The mixture is cooled; the aqueous phase is discarded and the organic phase is dried overnight at 60° C. in a vacuum oven. The residue is ground into fine granules and dried to a constant weight at 60° C. in the vacuum oven. Yield 162 gm (81%) poly-2-vinylpyridine. This product can be expected to provide the following results upon analysis by gel permeation chromotography:

Weight - average molecular weight—555,000

Number - average molecular weight—199,000

P2VP is manufactured by the Ionac Chemical Co., Birmingham, Alabama: typical weight—average molecular weight—301,000; typical number—average molecular weight—128,000.

P4VP may be synthesized as follows:

Freshly distilled 4-vinylpyridine is purged with nitrogen for one hour. The 4-vinylpyridine is heated with stirring under a continuing nitrogen purge to 160° C. and maintained at that temperature for 90 minutes. The contents of the reactor will darken and thicken during this time until agitation becomes very difficult to maintain. The reaction product is then poured warm into a container for storage and tightly sealed.

The product can be expected to provide the following results upon analysis by gel permeation chromatography:

% volatiles (probably monomer)—34%

Average molecular weight—6000 (includes monomer).

P4VP may be obtained commercially from Polysciences, Inc., identified as #0112.

Having described the invention, the embodiments thereof in which an exclusive property right is claimed are defined in the following claims:

1. A composition comprising an initial polyvinylpyridine polymer component, selected from the group consisting of P2VP, P4VP and mixtures thereof, and iodine in a predetermined mole ratio of from about 20:1 to about 40:1, the composition having a conductivity measured at 37° C. of at least about $1.5 \times 10^{-3}$ reciprocal ohm-cm and being formed in a sealed container by mixing the polymer component and at least a portion of the iodine together and by heating the polymer component before or during mixing, or by heating the resultant mixture, to a temperature in excess of about 225° C., and thereafter adding the remaining balance, if any, of the iodine to make-up the predetermined mole ratio.

2. A composition comprising an initial polyvinylpyridine polymer component, selected from the group consisting of P2VP, P4VP and mixtures thereof, and iodine in a predetermined mole ratio of at least about 20:1, the composition having a conductivity measured at 37° C. of at least about $1.5 \times 10^{-3}$ reciprocal ohm-cm and being formed in a sealed container by mixing the polymer component and at least a portion of the iodine together and by heating the polymer component before or during mixing, or by heating the resultant mixture, to a temperature in excess of about 225° C. and thereafter adding the remaining balance, if any, of the iodine to make-up the predetermined mole ratio.

3. The composition of claim 1 wherein the mole ratio is from about 20:1 up to about 40:1 and the conductivity at 37° C. is at least about $3 \times 10^{-3}$ reciprocal ohm-cm.

* * * * *